(12) United States Patent
Chiu et al.

(10) Patent No.: US 7,254,185 B2
(45) Date of Patent: Aug. 7, 2007

(54) METHOD FOR RECOVERING A DIGITAL DATA CONTENT IN A COMMUNICATION SYSTEM AND APPARATUS FOR PERFORMING THE SAME

(75) Inventors: Mao-Ching Chiu, Palo Alto, CA (US); Chi-Chao Chao, Palo Alto, CA (US); Chao-Ming Chang, Palo Alto, CA (US); Tai-Yuan Cheng, Palo Alto, CA (US); Hung-Kun Chen, Palo-Alto, CA (US)

(73) Assignee: Mediatek Incorporation, Hsinchu (TW)

( * ) Notice: Subject to any disclaimer, the term of this patent is extended or adjusted under 35 U.S.C. 154(b) by 673 days.

(21) Appl. No.: 10/065,678

(22) Filed: Nov. 7, 2002

(65) Prior Publication Data

US 2003/0174786 A1   Sep. 18, 2003

Related U.S. Application Data

(60) Provisional application No. 60/363,988, filed on Mar. 14, 2002.

(51) Int. Cl.
*H03K 9/00* (2006.01)
(52) U.S. Cl. ................. 375/316; 348/537; 348/538; 375/355; 370/395.62; 398/154; 398/155; 702/89
(58) Field of Classification Search ........... 348/465; 360/51; 369/59.22; 375/232, 247, 316, 375/355, 373; 370/214; 708/313
See application file for complete search history.

(56) References Cited

U.S. PATENT DOCUMENTS 4,453,259 A * 6/1984 Miller .................. 375/355

OTHER PUBLICATIONS

Funderburk et al; Asynchronous timing recovery for passband PS-FSE for single-chip V.32 modems; Nov. 29-Dec. 2, 1993; IEEE Globecom 1993; pp. 514-520.*
Lee et al.; Digital Communication; 1988; Kluwer Academic Publishers, pp. 14-15.*
Jui-Yuan Lin et al., "Adaptive Nonlinear Decision Feedback Equalization with Channel Estimation and Timing Recovery in Digital magnetic Recording Systems" IEEE Transactions on Circuits and Systems-II: Analog and Digital Signal Processing, vol. 42, No. 3, Mar. 1995, pp. 196-206.

(Continued)

*Primary Examiner*—David C. Payne
*Assistant Examiner*—Adolf DSouza
(74) *Attorney, Agent, or Firm*—Thomas, Kayden, Horstemeyer & Risley

(57) ABSTRACT

A method is directed to recovering a digital data content in a communication system, wherein the digital data content has been converted into an analog signal based on a primary clock, at a transmitter for transmitting to a receiver. The method comprises receiving the analog signal by the receiver. The analog signal is converted into a digital signal, based on a clock of the receiver. The digital signal is interpolated at the desired interpolation point, if digital signal in time has been shifted by an amount equal to or larger than a predetermined time length. The interpolated digital signal is recovered back to the digital data content, with the assist of an estimated channel impulse response. The channel impulse response is retrained every time when the interpolation point is significantly changed.

12 Claims, 3 Drawing Sheets

OTHER PUBLICATIONS

Chao-Ming Chang et al., "Reverse Link Pilot-Tones Aided Synchronization in DS-CDMA Communication System" Proc. IEEE Globecom, Nov. 1998, pp. 3408-3413.

Kurt H. Mueller et al., "Timing Recovery in Digital Synchronous Data Receivers" IEEE Transactions on Communications, vol. COM-24, No. 5, May 1976, pp. 516-531.

J. Bao et al., "A New Timing Recovery Method for DTV Receivers" IEEE Transactions on Consumer Electronics, vol. 44, No. 4, Nov. 1998, pp. 1243-1249.

\* cited by examiner

METHOD FOR RECOVERING A DIGITAL DATA CONTENT IN A COMMUNICATION SYSTEM AND APPARATUS FOR PERFORMING THE SAME

CROSS REFERENCE TO RELATED APPLICATIONS

This application claims the priority benefit of U.S.A. provisional application Ser. No. 60/363,988, filed on Mar. 14, 2002, all disclosures are incorporated therewith.

BACKGROUND OF INVENTION

1. Field of Invention

The present invention relates to a communication technology in signal processing. More particularly, the present invention relates to a method for recovering a digital data content in a communication system and an apparatus to perform the method.

2. Description of Related Art

Nowadays, the wireless communication has been a very usual way taken by people for communication between two places without much restriction in space and distance. In addition, since the digital data technology has also been well developed, most of the wireless communications now have been in a digital manner. In digital communication, the digital data content at the transmitting end is converted into a radio frequency (RF) analog signal for transmission. After receiving the RF analog signal, the receiving end performs the conversion of the RF analog signal to the digital data content.

At the transmitting end, the digital data content is first converted into digital signal according to the applied coding scheme, modulation scheme, and etc. The digital signal is then converted by a digital-to-analog converter (DAC) to an analog signal according to a local clock 102 shown in FIG. 1. The analog signal is then further processed, for example, shifting the central frequency of the analog signal to a radio frequency band, for transmission. At the receiving end, the received RF analog signal is first processed, for example, reducing the central frequency of the RF analog signal to a much lower one. The analog signal is then converted into a digital signal by an analog-to-digital converter (ADC), which samples the analog signal in time domain based on a local clock 104 shown in FIG. 1, and quantizes the sampled signal amplitude for further digital signal process (DSP).

However, the clock rates between the transmitting and receiving ends are generally different, that is, the clock periods of the clock 102 at transmitting end and the clock 104 at the receiving end are generally different, and accordingly cause serious degradation of DSP performance at the receiving end. As an example shown in FIG. 1, the timing drift, which is the time distance between the ticks of the clock 102 and the clock 104, increases linearly due to the mismatch of the clock rates. Usually, the time drift will cause an accumulative divergence of synchronization between two timing device or sources. When the timing drift is accumulated up to a certain quantity, it could cause serious errors in data recovery.

Traditionally, one solution to timing drift problem may concentrate on increasing the timing resolution via increasing the clock rate of the clock 104 at the receiving end and accordingly increasing the ADC sampling rate. The receiver can then select those sampled digital signal at more precise sampling position so that the timing drift are controlled to be less than the ADC sampling period, which is defined to be the inverse of the ADC sampling rate. However, the use of a high-sampling-rate ADC increases not only the cost but also the complexity of the design. Although the use of a low-sampling-rate ADC is a proper way to reduce the cost as well as the complexity of the design, the timing resolution is decreased. Moreover, due to the decrease of the timing resolution, the timing drift problem gets more serious and the system performance is then degraded.

Alternatively, an interpolator may be used to accept the output of the ADC and generate an output, called interpolated digital signal, with increased timing accuracy by interpolating the input signal at the desired time point, named interpolation points, so that the timing of the interpolated digital signal coincides with that of the clock at transmitting end. According to the Nyquist sampling theorem, which is commonly familiar to those skilled artisans in the art, the original analog signal waveform can be exactly reconstructed according to its sampled signal if the sampling rate is higher than a Nyquist rate, which is defined to be equal to twice of the signal spectrum bandwidth. Otherwise, signal distortion will occur so that the original analog signal will not be recovered exactly. Hence, theoretically, an ADC with sampling rate higher than the Nyquist rate plus an ideal interpolator is sufficient to generate digital signals having any required timing accuracy without signal distortion.

The usage of a simplified interpolator, which equipped with a small number of the interpolation filter coefficients, to replace the ideal interpolator, which would need a large number of the interpolation filter coefficients, can further decrease the complexity of the interpolator. An example of the simplified interpolator is a simplified linear interpolator that employs only two coefficients to compute the signal at a specified time point between those of two consecutive input signals. However, the simplified interpolator will cause signal distortion due to the small number of interpolation filter coefficients. And the system performance degrades.

SUMMARY OF INVENTION

The invention provides a method for recovering a digital data content in a communication system and an apparatus to perform the method. At least, the timing drift problem can be effectively reduced. The points of this invention include the features as follows: (I) The timing drift problem can be dealt with a low-sampling-rate ADC and a simplified interpolator, instead a high-sampling-rate ADC and an ideal interpolator. (II) The cooperation between the channel estimator and the interpolator, whenever the coefficients of the interpolator are changed, the channel estimator should retrain itself.

As embodied and broadly described herein, the invention provides a method for recovering a digital data content in a communication system. The method includes first receiving an analog signal and converting the analog signal in to a sampled digital signal stream, which is sampled based on a local clock. B1 An initialization process is performed to set up an initial condition. At the initial phase, the channel estimator starts to estimate the channel impulse response, which is a set of coefficients with raw quantities for representing a shape of the channel impulse response, and the interpolator initializes the interpolation filter coefficients. B1 The timing tracking unit calculates and outputs the interpolation point that is the time point that the interpolator should interpolated at. Based on the interpolation point, no matter it is changed or not, instructed by the timing tracking unit, the interpolator interpolates the sampled digital signal from ADC and outputs an interpolated digital signal. The interpolated digital signal is recovered into actual digital data content by the data detector with the assistant information of the coefficients of the channel impulse response. Once the interpolation point is changed, that is, the interpolation point is different from the previous determined one, the timing tracking unit generates a retraining signal to the channel estimator so that a retraining process in the channel estimator is performed to update the coefficients of the channel impulse response. Thereafter, the data detector will use the updated coefficients of the channel impulse response. In the forgoing procedure, once the interpolation point is changed, the estimate of the channel impulse response is then accordingly updated.

The invention also provides an apparatus for recovering digital data content in a communication system. The apparatus is used in a receiver, in which the digital data content has been converted into an analog signal at a transmitter and transmitted over the channel. The apparatus has an analog-to-digital converter (ADC), used to receive the analog signal and convert into sampled digital signal according to a local clock at the receiver. An interpolation unit with input from the ADC is used to interpolate the sampled digital signal at desired interpolation point constructed by the timing tracking unit and outputs the interpolated digital signal. A channel estimator receives the interpolated digital signal from the interpolation unit and a retraining signal from the timing tracking unit and produce a set of coefficients as the estimate of the channel impulse response. The channel estimator starts to estimate the channel impulse response at the initial phase or whenever a retraining signal is received. A data detector receives the interpolated digital signal from the interpolation unit and an estimate of the channel impulse response from the channel estimator, so as to recover the interpolated digital signal back to the current actual digital data content. A timing tracking unit receives the detected digital data content from the data detector and an estimate of the channel impulse response from the channel estimator, to determine the interpolation point. The determined interpolation point is then sent back to the interpolator. Once the interpolation point is changed, a retraining signal is then generated and sent to the channel estimator for proceeding its retraining process to produce an updated coefficients of channel impulse response for the use of the other models in the system.

It is to be understood that both the foregoing general descriptions and the following detailed descriptions are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the descriptions, serve to explain the principles of the invention. In the drawings.

DETAILED DESCRIPTION

Figure 2:
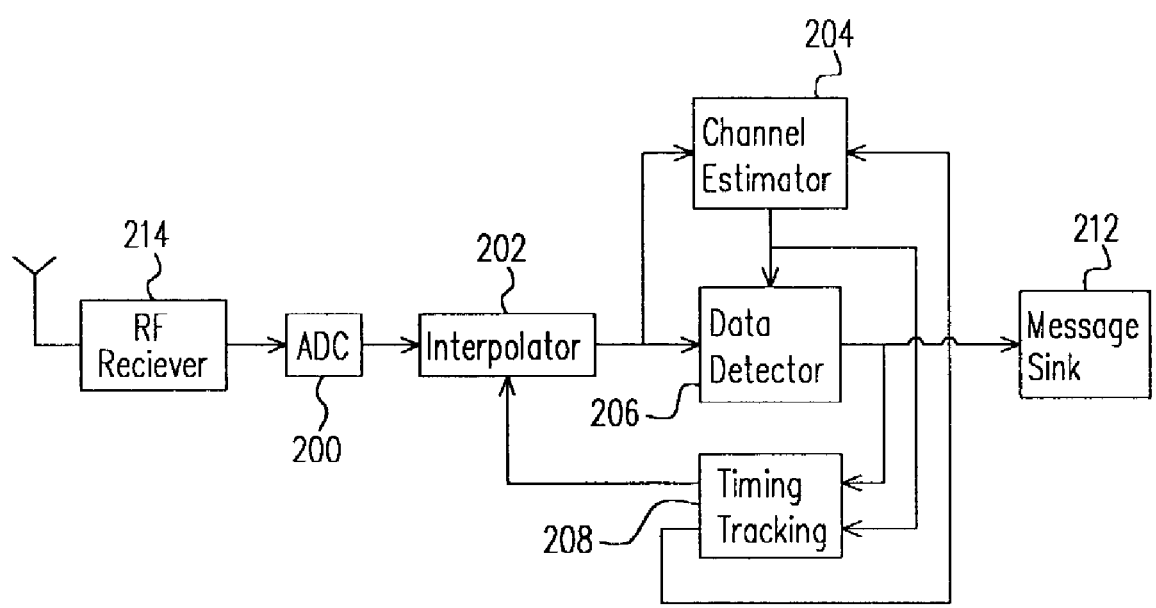
FIG. 2 is a block diagram, schematically illustrating an apparatus for processing the received analog signal, so as to recover the digital data content in wireless communication, according to a preferred embodiment of the invention.
Figure 3:
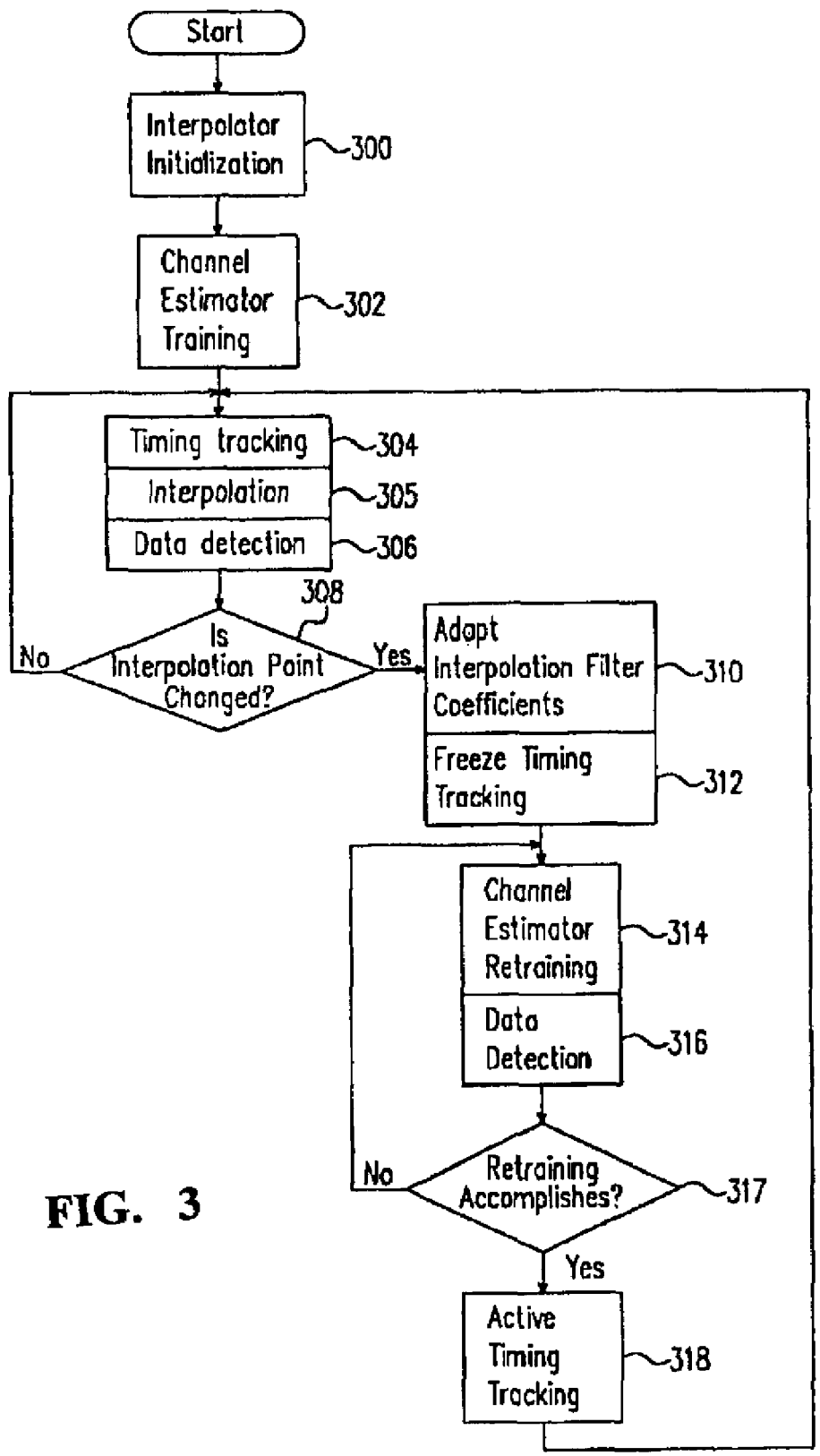
FIG. 3 is a processing diagram, schematically illustrating a method for processing the received analog signal, so as to recover the digital data content in wireless communication, according to a preferred embodiment of the invention.

FIG. 2 is a block diagram, schematically illustrating an apparatus for processing the received analog signal, so as to recover the digital data content in wireless communications, according to a preferred embodiment of the invention. In FIG. 2, the present invention provides an apparatus used in the receiver to sample the analog signal at the desired time point by interpolation method to cope with the timing drift problem. The apparatus includes, for example, a RF receiver 214, an ADC 200, such as a low-sampling-rate ADC 200, an interpolator 202, such as a simplified interpolator 202, a channel estimator 204, a timing tracking unit 208, a data detector 206, and a message sink 212.

By using, for example, the low-sampling-rate ADC 200 and the simplified interpolator 202, the implementation complexity is reduced. This is one of the essential points of the invention. Because of the coordination operation between the channel estimator 204 and the simplified interpolator 202, the signal distortion caused by the simplified interpolator 202 can be made up and the system performance is increased. This is also one of the essential points of the invention. For example, the performance gain can be increased up to 2 dB as compared with the case of no coordination operation between the simplified interpolator 202 and the channel estimator 204 according to simulation.

Figure 1:
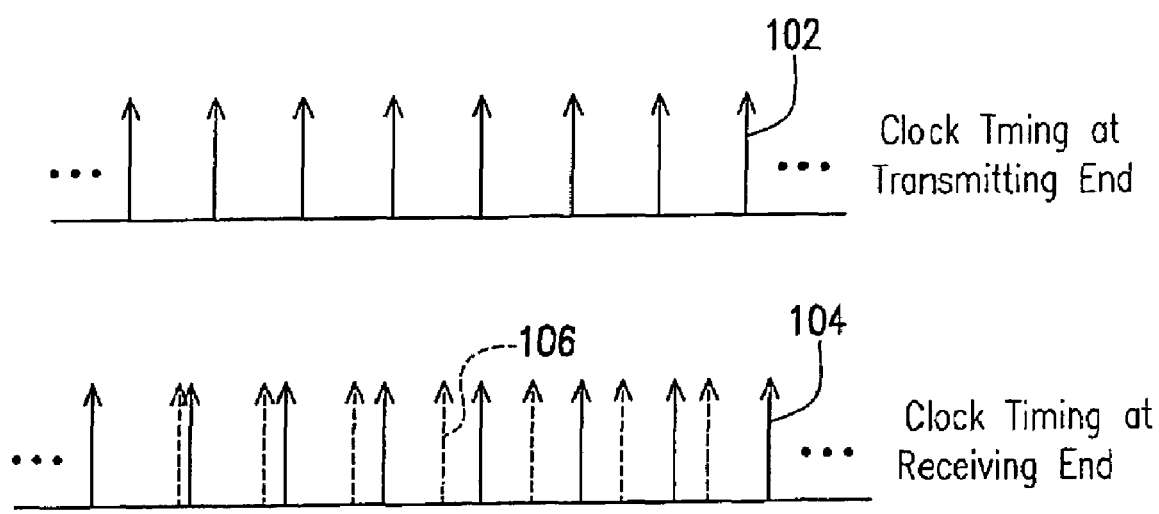
FIG. 1 is a drawing, exemplarily illustrating the difference of clock rates at the transmitting end and at the receiving end.

In order to avoid the foregoing errors, an interpolator 202 is used to interpolate the sampled digital signal from the ADC 200 and output an interpolated digital signal whose signal rate consists with the clock rate at the transmitter, as shown in FIG 1. The clock 106 indicates the ticks to be interpolated out in the invention and is consisting with the clock 102 of the transmitting end with the same clock rate. The interpolated digital signal is a function of the sampled digital signal from the ADC 200. A timing tracking unit 208 is used to track the clock rate at the transmitter and then instructs which interpolation point the interpolator should interpolate at. There are various designs for the timing tracking unit 208. The process of the timing tracking may base on the digital data content from the data detector 206, as an example shown in FIG 2, or the interpolated digital signal from the interpolator 202, or even an assistant pilot signal containing timing information from the transmitter. The function of the timing tracking unit 208 associating with other units will be described later in more detail.

At the transmitter, the digital data is converted to a continuous waveform based on a local clock. Clock rates between transmitting and receiving ends are usually different and the clock rate mismatch causes serious performance degradation when recovering the data. This is called timing drift problem. As shown in FIG. 1, the clock rates at the transmitting end and the receiving end are in general not precisely matched. If the sampling points of the ADC 200 do drift away from those of the clock at the transmitter, the digital signal outputted from the ADC 200 will not be able to correctly represent the received analog signal. When the difference is accumulated up to a certain quantity, it could cause errors in data recovery due to timing drift.

In order to avoid the foregoing errors, an interpolator 202 is used to interpolate the sampled digital signal from the ADC 200 and output an interpolated digital signal whose signal rate consists with the clock rate at the transmitter, as shown in FIG. 1. The interpolated digital signal is a function of the sampled digital signal from the ADC 200. A timing tracking unit 208 is used to track the clock rate at the transmitter and then instructs which interpolation point the interpolator should interpolate at. There are various designs for the timing tracking unit 208. The process of the timing tracking may base on the digital data content from the data detector 206, as an example shown in FIG. 2, or the interpolated digital signal from the interpolator 202, or even an assistant pilot signal containing timing information from the transmitter. The function of the timing tracking unit 208 associating with other units will be described later in more detail.

The interpolated digital signal from the interpolator 202 is then sent to the data detector 206. The data detector 206 converts the interpolated digital signal from the interpolator into the actual digital data content, in which the data detector 206 could use the information of the estimated coefficients of the channel impulse response from the channel estimator 204. The detected digital data content can feed into the message sink 212. In general, the data detector is used to detect the data and can have many possibilities for the functional block. Similarly, the timing tracking unit has many possibilities for the functional block. The blocks shown in FIG. 2 is just one example.

Usually, when the data transmission action starts, it has an initial stage. During the initial stage, the interpolation filter coefficients in the interpolator 202 are initialized. Then, the transmitter sends some specific test signals, for example, signals specified by the relative standard, that are assumed known to the receiver so that the channel estimator 204 can estimate the channel impulse response, which is a set of coefficients used to describe the shape of the channel impulse response, based on the test signals. The theories for estimating the channel impulse response are complicated but have been well developed in the art, and the detail is not described here. Therefore, during the initial stage, the output from the ADC 200 is passed through the interpolator 202 and sent to the channel estimator 204 to estimate an initial channel impulse response.

The channel estimator 204 and the timing tracking unit 208 are two essential units to be cooperated together, so as to compensate for the signal distortion due to the change of the interpolation filter coefficients in the interpolator 202.

After the initial stage, the initial estimate of the channel impulse response and the initial interpolation filter coefficients are set up. Then, the data detector 206 recovers the digital data content based on the interpolated digital signal from the interpolator 202 and the estimated channel impulse response. The digital data content can be feed back to the timing tracking unit 208 to calculate the interpolation point. The timing tracking unit 208 may use the estimate of the channel impulse response from the channel estimator 204 to improve the timing tacking performance. The interpolator 202 then interpolates the sampled digital signal form the ADC 200 at the interpolation point instructed by the timing tracking unit 208.

The timing tracking unit 208 also generates a retraining signal whenever the interpolation point is changed. The channel estimator 204 usually needs not to retrain the coefficients until the retaining signal is received, in which the retaining process means the quantities of the set of coefficients to describe the channel impulse response are updated. When the interpolation point is changed, the interpolator 202 will update its interpolation filter coefficients accordingly, and the overall channel impulse response seen by the channel estimator 204 is also changed. In the invention, the channel estimator 204 is designed to accordingly perform the retraining process to update the channel impulse response once the interpolation point is changed that is indicated by the retaining signal.

During stage for the channel estimator 204 to update its coefficients when the interpolation point is changed, the process of timing tracking unit 208 may be temporarily frozen. After the new updated set of coefficients of the channel impulse response is obtained, the process of the timing tracking unit is awaken. The updated set of coefficients of the channel impulse response is properly feedback to the necessary units in the system so as to increase the system performance. For example, as shown in FIG. 2, the detection error can be reduced in data detector 206 based on the re-estimated coefficients of the channel impulse response instead of the old ones.

In the step 308, when the interpolation point instructed by the timing tracking unit 208 is changed, the interpolator 202 will adapt its interpolation filter coefficients according to the new interpolation point, as shown in the step 310. Also the timing tracking process may be temporarily frozen, as shown in the step 312 simultaneously, so as to increase the stability of the upcoming channel estimator retraining process. After the filter coefficients of the interpolator are adapted, the retraining process of the channel estimator 204 is performed subsequently, as shown in the step 314, to estimate the new coefficients of the channel impulse response. Meanwhile, the data detection in step 316 at the data detector 206 keeps outputting decoded data so that the data communication is still ongoing. While the retaining process 314 of the channel estimator 204 accomplishes, the timing tracking process 304 will then be activated, as shown in step 318. Both the timing tracking process 304 and data detecting process 306 are now performed based on the updated coefficients of the channel impulse response provided by the channel estimator 204. The steps 310-316 will repeat again, once the interpolation point is changed. The steps 310-316 are essential in the invention. It allows the estimated channel impulse response to be dynamically updated. This can significantly reduce the detection error of the data detector 206. Further, in order to more easily to determine the interpolation point in timing tracking unit 208, a time interval between two adjacent sampling clock points, or the ticks in FIG. 1. are evenly divided into a number of sub-time intervals, so that a set of time points is formed, the timing tracking unit tracks an actual interpolation point, chooses the one of the set of the time points closest to the actual interpolation point, and outputs the chosen time point as the interpolation point to the interpolation unit.

In general, thereafter in the rest steps, for every sample of the analog signal, that is, the sampled digital signal, the timing tracking unit 208 is activated to perform the timing tracking process in the step 304, and the interpolator 202 performs the interpolation in step 305. In the step 306, the data detector 206 outputs the detected data as the digital data content. In the step 308, while the interpolation point instructed by the timing tracking unit 208 is unchanged, then the process goes back to the step 304. Then the timing tracking process 304, the interpolation process 305, and the data detecting process 306 are continuously performed according to the incoming sampled digital signal from ADC 200.

In the step 308, when the interpolation point instructed by the timing tracking unit 208 is changed, the interpolator 202 will adapt its interpolation filter coefficients according to the new interpolation point, as shown in the step 310. Also the timing tracking process may be temporarily frozen, as shown in the step 312 simultaneously, so as to increase the stability of the upcoming channel estimator retraining process. After the filter coefficients of the interpolator are adapted, the retraining process of the channel estimator 204 is performed subsequently, as shown in the step 314, to estimate the new coefficients of the channel impulse response. Meanwhile, the data detection in step 316 at the data detector 206 keeps outputting decoded data so that the data communication is still ongoing. While the retraining process 314 of the channel estimator 204 accomplishes, the timing tracking process 304 will then be activated, as shown in step 318. Both the timing tracking process 304 and data detecting process 306 are now performed based on the updated coefficients of the channel impulse response provided by the channel estimator 204. The steps 310-316 will repeat again, once the interpolation point is changed. The steps 310-316 are essential in the invention. It allows the estimated channel impulse response to be dynamically updated. This can significantly reduce the detection error of the data detector 206.

In conclusions, the present invention particularly introduce the method and the apparatus to convert an analog signal into the digital data content with the features that the coefficient of the channel impulse response is dynamically adapted according to the timing drift situation. Since the coefficient of the channel impulse response is dynamically updated the data detection error is greatly reduced.

It will be apparent to those skilled artisans in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

The invention claimed is:

1. A method for recovering a digital data content in a communication system, wherein the digital data content has been converted into an analog signal for transmitting from a transmitter to a receiver through a communication channel, the method comprising:

receiving the analog signal by the receiver, converting the analog signal into a sampled digital signal, based on a local sampling clock;

performing a interpolation process to interpolate the sampled digital signal at an interpolation point for generating an interpolated digital signal;

performing a timing tracking process to determine the interpolation point where the interpolation is to be taken at and determine whether or not the interpolation point is changed and different from the previous determined interpolation point;

estimating a channel impulse response described by a set of coefficients based on the interpolated digital signal when the interpolation point is changed;

detecting the digital data content from the interpolated digital signal and the estimated coefficients of channel impulse response;

performing an update process if the interpolation point has been changed, wherein the update process comprises:

updating the filter coefficients used in the interpolation process according to the interpolation point;

performing a retraining process to update the set of coefficients of the channel impulse response, according to the interpolated digital signal, wherein the timing tracking process is simultaneously paused as the interpolation point is changed, and the timing tracking process is simultaneously awakened as the retraining process is accomplished.

2. The method in claim 1, further comprises an initialization process to produce an initial condition, wherein the initial condition includes an initial set of coefficients of channel impulse response and initial filter coefficients used in the interpolation process.

3. The method of claim 1, wherein the timing tracking process is operated, according to the interpolated digital signal, the detected digital data content, or a pilot signal containing timing information for determining the interpolation point.

4. The method of claim 1, wherein the timing tracking process is performed with the information of the estimated channel impulse response.

5. An apparatus for recovering a digital data content in a communication system, used in a receiver, wherein the digital data content has been converted into an analog signal at a transmitter for transmission to the receiver through a communication channel, the apparatus comprising:

an analog-to-digital converter (ADC), used to receive the analog signal and convert into a sampled digital signal according to a local sampling clock;

an interpolation unit, receiving the sampled digital signal from the ADC, wherein interpolation unit is used to interpolate the sampled digital signal at an interpolation point and output an interpolated digital signal;

a channel estimator, receiving an output of the interpolation unit and a refraining signal, wherein the channel estimator produces a set of coefficients for representing a shape of the channel impulse response, and perform a retraining process to update the coefficients when a refraining signal is received;

a data detector, receiving the interpolated digital signal from the interpolation unit and an information from the channel estimator, including the set of coefficients for the channel impulse response, so as to recover the interpolated digital signal back to the current actual digital data content; and a timing tracking unit, used to determine the interpolation point, and generate the retraining signal when the interpolation point is changed and different from the previous determined interpolation point, wherein the timing tracking unit is simultaneously paused to perform retraining process while the interpolation point is changed, and the timing tracking unit is simultaneously awakened as the channel estimator finishes the refraining process.

6. The apparatus of claim 5, wherein when the apparatus is operated under an initial stage before actually transmitting actual desired data, the channel estimator determines an initial set of coefficients of the channel impulse response, and the interpolation unit determines the filter coefficients for interpolation.

7. The apparatus of claim 5, wherein coefficients of the channel impulse response from the channel estimator is further connected to the timing tracking unit for providing the information of the channel impulse response.

8. The apparatus of claim 5, wherein the timing tracking unit can receive the current actual digital content, the interpolated digital signal, or a pilot signal containing timing information to determine the interpolation point.

9. The apparatus of claim 5, wherein the ADC has a sampling rate larger than and close to a Nyquist rate of the received analog signal.

10. The apparatus of claim 5, wherein the interpolation unit includes a digital filter with finite-length filter coefficients.

11. The apparatus of claim 10, wherein the number of the filter coefficients is two.

12. The apparatus of claim 5, wherein a time interval between two adjacent sampling clock points are evenly divided into a number of sub-time intervals, so that a set of time points is formed, the timing tracking unit tacks an actual interpolation point, chooses the one of the set of the time points closet to the actual interpolation point, and outputs the chosen time point as the interpolation point to the interpolation unit.

* * * * *